M. De YONGE.
WATER COOLER.

No. 182,749. Patented Oct. 3, 1876.

WITNESSES
Ullman Strong
Frederic Ullmann

INVENTOR
Marinus de Yonge
By F. F. Warner
(his atty)

UNITED STATES PATENT OFFICE.

MARINUS DE YONGE, OF CHICAGO, ILLINOIS.

IMPROVEMENT IN WATER-COOLERS.

Specification forming part of Letters Patent No. 182,749, dated October 3, 1876; application filed August 17, 1876.

*To all whom it may concern:*

Be it known that I, MARINUS DE YONGE, of Chicago, in the county of Cook and State of Illinois, have invented certain new and useful Improvements in Water-Coolers, of which the following is a full, clear, and exact description, which will enable others skilled in the art to which my invention appertains to make and use the said improvements, reference being had to the accompanying drawing, forming a part hereof, and in which—

Figure 1:
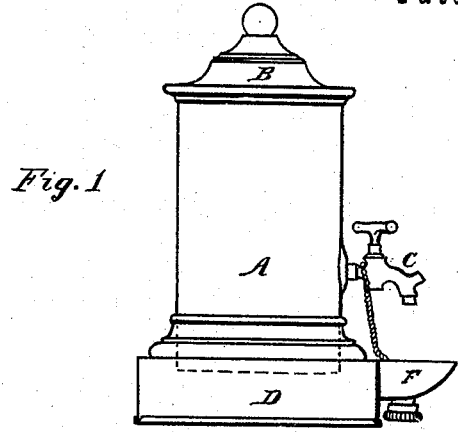
Figure 2:
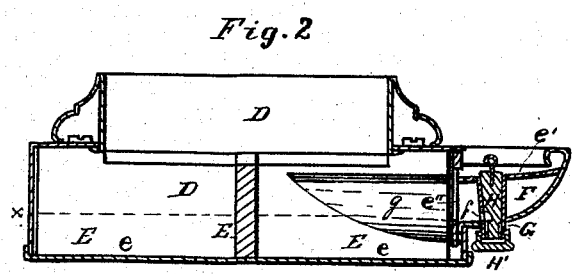
Figure 3:
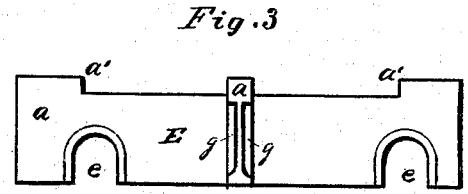
Figure 4:
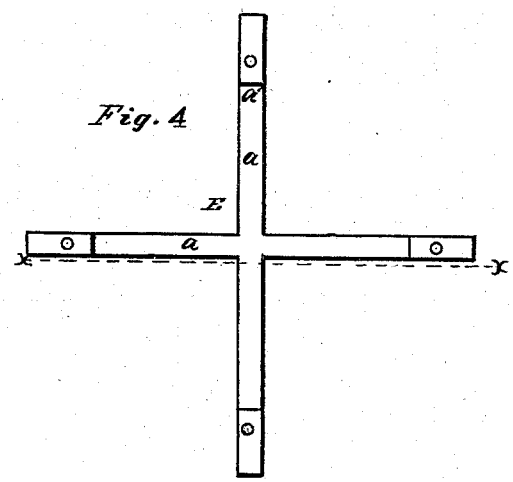

Figure 1 is a side elevation of a water-cooler provided with my improvements; Fig. 2, a vertical cross-section of the base in the plane indicated by the line $x$ $x$ of Fig. 4; Fig. 3, an elevation of the supporting-frame; and Fig. 4, a top or plan view thereof.

Like letters of reference indicate like parts.

In the drawing, A represents the tank of a water-cooler. B is a removable lid, and C a cock or faucet to draw off the water. D is the base of the cooler, or the platform for receiving the tank. This base is made hollow, and the tank projects downwardly into it a little way, as indicated by the broken lines in Fig. 1. E is a supporting-frame arranged within the base for supporting the tank. This frame is made preferably of bars of wood $a$ $a$, arranged transversely to each other, and preferably shouldered, as shown at $a'$ $a'$, to aid in preventing the lateral movement of the tank. The lower edges of the bars $a$ $a$ are arched, as shown at $e$ $e$. F is a hollow water-drip or basin attached to the base D, and arranged directly below the faucet. The upper floor $e'$ of the drip-basin is perforated to allow the water to enter the basin, and an opening, $e''$, allows the water to flow from the basin into the base. G is a tube or pipe passing through the basin D, and $f$ is an opening in this pipe. H is a removable plug or stopper in the pipe G, and H' is a removable thimble or stopper on the lower end of the said pipe. That end of the frame E which is adjacent to the drip-dish may be beveled off, as shown at $g$ $g$, so that it will offer less obstruction to the water flowing from the dish into the base.

It will be perceived from the foregoing description that the base D, when made in the manner described, will not only be light, cheap, and durable, but that it also constitutes a reservoir to receive the water which drips from the tank, and that this water is thus utilized in aiding to keep the contents of the tank cool. The frame E, by supporting the tank, admits of the base being made light and of sheet-metal. The tank may be removed with facility, thus preventing the necessity of moving about a heavy base at any time. The water in the base may be drawn off by removing the plugs, and without tilting the base for that purpose. When the base is not tilted, however, water will remain therein to the depth indicated by the broken line in Fig. 2, thus always leaving a certain amount of water in the tank, when desired, without exercising care as to the amount drawn off. The water may be entirely drawn by tilting the tank for that purpose. The arches $e$ $e$ admit of the free circulation of the water within the base.

Having thus described my invention, what I claim as new, and desire to secure by Letters Patent, is—

1. The combination of the removable tank, the hollow base, the tank-supporting frame, the drip-dish communicating with the base, and a plug, substantially as and for the purposes specified.

2. The combination of the removable tank, the hollow metallic base to receive the tank, the arched wooden frame or tank-support E within the base, the hollow drip-dish F communicating with the base, and provided with the plug-receiver G, having an opening, $f$, therein, substantially as and for the purposes specified.

MARINUS DE YONGE.

Witnesses:
F. F. WARNER,
J. H. LAWLOR.